United States Patent
Jung et al.

(10) Patent No.: US 10,753,916 B2
(45) Date of Patent: Aug. 25, 2020

(54) SYSTEMS, METHODS, AND DEVICES FOR DETECTING LEAKS IN A CHROMATOGRAPHY SYSTEM

(71) Applicant: Waters Technologies Corporation, Milford, MA (US)

(72) Inventors: Moon Chul Jung, Waltham, MA (US); Jonathan L. Belanger, Whitinsville, MA (US); Xiangjin Song, Westborough, MA (US); Abhijit Tarafder, Franklin, MA (US); Joseph A. Jarrell, Newton Highlands, MA (US); Wade P. Leveille, Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 211 days.

(21) Appl. No.: 15/872,842

(22) Filed: Jan. 16, 2018

(65) Prior Publication Data
US 2018/0202983 A1 Jul. 19, 2018

Related U.S. Application Data

(60) Provisional application No. 62/447,232, filed on Jan. 17, 2017.

(51) Int. Cl.
*G01N 30/88* (2006.01)
*G01M 3/20* (2006.01)
(Continued)

(52) U.S. Cl.
CPC ............ *G01N 30/88* (2013.01); *G01M 3/202* (2013.01); *G01M 3/26* (2013.01); *G01N 30/02* (2013.01);
(Continued)

(58) Field of Classification Search
None
See application file for complete search history.

(56) References Cited

U.S. PATENT DOCUMENTS

| | | | |
|---|---|---|---|
| 5,052,216 A | 10/1991 | Sharp | |
| 6,324,892 B1 * | 12/2001 | Nishina | ................... G01N 1/26 73/23.2 |

(Continued)

FOREIGN PATENT DOCUMENTS

| | | |
|---|---|---|
| EP | 2244091 A1 | 10/2010 |
| EP | 2957805 A1 | 12/2015 |
| JP | 7-318549 * | 12/1995 ............. G01N 30/36 |

OTHER PUBLICATIONS

International Search Report and Written Opinion for International application No. PCT/IB2018/050274 dated Apr. 16, 2018 and mailed on Apr. 26, 2018.

*Primary Examiner* — Daniel S Larkin
(74) *Attorney, Agent, or Firm* — Womble Bond Dickinson (us) LLP; Deborah M. Vernon; Heath T. Misley

(57) ABSTRACT

Systems, methods, and devices for detecting leaks in chromatography systems are disclosed. The leak detection system includes a sealable compartment disposed to surround at least one component of a chromatography system. The detector is in communication, e.g., fluid communication, with an interior of the sealable compartment and configured to detect the leak by various mean including the presence of liquid or the presence of vapor, or both within the sealable compartment.

5 Claims, 2 Drawing Sheets

(51) Int. Cl.
    *G01N 30/60*     (2006.01)
    *G01N 30/86*     (2006.01)
    *G01M 3/26*     (2006.01)
    *G01N 30/02*     (2006.01)
    *G01N 30/26*     (2006.01)
    *G01N 30/04*     (2006.01)

(52) U.S. Cl.
    CPC ..... *G01N 30/6052* (2013.01); *G01N 30/8675* (2013.01); *G01N 30/04* (2013.01); *G01N 30/26* (2013.01); *G01N 2030/889* (2013.01)

(56) References Cited

U.S. PATENT DOCUMENTS

| | | | | |
|---|---|---|---|---|
| 7,752,890 | B2* | 7/2010 | Weitz | G01M 3/16 |
| | | | | 73/40 |
| 7,836,750 | B2* | 11/2010 | van den Heuvel | G01M 3/186 |
| | | | | 73/23.4 |
| 9,518,961 | B2* | 12/2016 | Takahashi | G01N 30/30 |
| 2007/0224693 | A1* | 9/2007 | Prest | G01N 30/34 |
| | | | | 436/161 |
| 2009/0223369 | A1* | 9/2009 | Uegaki | F27D 21/0028 |
| | | | | 96/102 |
| 2013/0219992 | A1* | 8/2013 | Okada | G01N 30/28 |
| | | | | 73/23.41 |

\* cited by examiner

SYSTEMS, METHODS, AND DEVICES FOR DETECTING LEAKS IN A CHROMATOGRAPHY SYSTEM

RELATED APPLICATIONS

This application claims the benefit of U.S. Provisional Patent Application 62/447,232 filed on Jan. 17, 2017 titled "SYSTEMS, METHODS, AND DEVICES FOR DETECTING LEAKS IN A CHROMATOGRAPHY SYSTEM," the contents of which are incorporated herein by reference in its entirety.

FIELD OF THE INVENTION

The present disclosure generally relates to the detection of fluid leaks in chromatography systems.

BACKGROUND OF THE INVENTION

Chromatography systems perform separations using various fluids and mobile phases flowing through multiple components within the system. For example, solvents under low pressure can be delivered to a pump. The pump can deliver a controlled high pressure mobile phase to a column to effect a separation. The high pressure mobile phase exiting the column can be delivered to a detector for determining the separated components. Chromatography systems also use various other fluids, such as wash solutions and needle washes to clean retained compounds from the system. Chromatography systems also have waste stream(s) to collect the used fluids and mobile phase.

A leak in any one of these flows or streams can be detrimental. A leak in the high pressure mobile phase can interfere with the separation results, e.g., accuracy and reproducibility. A leak in the high pressure mobile phase can also be dangerous. Exposure to solvents can be harmful. Each component within the chromatography system should be sealed, or otherwise contained, in order to prevent leaks and maintain desired pressure and temperature levels within the system. Any leaks in the connecting tubes, fittings, or other components of a chromatography system should be identified and corrected. It can be difficult to detect leaks in chromatography systems, especially chromatography systems with low flow rates where fluid or mobile phase leaks are small.

SUMMARY OF THE INVENTION

The present disclosure generally relates to systems, methods, and devices for detecting leaks. In particular, the present disclosure relates to devices and methods to detect leaks in a chromatography system, including small leaks. In one embodiment, the current disclosure provides for an apparatus for detecting a fluid leak. The apparatus includes a sealable compartment disposed to surround at least one component of a chromatography system. The apparatus also includes a detector in fluid communication with an interior of the sealable compartment and configured to detect the fluid leak, e.g., a buildup of vapor within the sealable compartment. In some embodiments, the apparatus also includes a ventilation element configured to ventilate the sealable compartment.

In another embodiment, the present disclosure relates to an apparatus for detecting a fluid leak that includes a plurality of sealable compartments, wherein each sealable compartment is disposed to surround at least one component of a chromatography system. The apparatus also includes a detector configured to detect the fluid leak. Presence of liquid, vapor or both is indicative of the fluid leak, e.g., a buildup of vapor within one of the plurality of sealable compartments indicates a fluid leak. The apparatus also includes a plurality of fluid transfer lines, wherein each fluid transfer line is disposed to provide fluid communication between one of the plurality of sealable compartments and the detector. In some embodiments, the apparatus also includes a valve configured to control the fluid communication between the detector and the plurality of sealable compartments.

In another embodiment, the present disclosure relates to a method of detecting a leak in a chromatography system. The method includes sealing a plurality of components of a chromatography system within a sealable compartment. The method also includes detecting a fluid leak. Presence of liquid, vapor, or both within the sealable compartment is indicative of the fluid leak, e.g., a fluid leak is determined by a buildup of vapor within the sealable compartment using a gas sensitive detector.

In another embodiment, the present disclosure relates to a method of detecting a leak in a chromatography system including sealing a plurality of components of a chromatography system within a plurality of sealable compartments. The method also includes flowing a fluid, or controlling a fluid communication, between one or more of the plurality of sealable components. The method also includes monitoring or testing at least one of the compartments for a fluid leak. Presence of liquid, vapor, or both within the sealable compartment is indicative of the fluid leak, e.g., a vapor concentration within each of the plurality of sealable compartments using the gas sensitive detector.

The various leak detection techniques disclosed can provide a number of advantages over known leak detection systems. For example, some embodiments of the disclosure facilitate identification of leaks in a chromatography system, and the leaks may be smaller in scale than those detectable with conventional leak detection sensors. Embodiments of the present disclosure can also identify one or more elements of a chromatography system where a leak is present. Some embodiments of the present disclosure can detect the location of a vapor leak within a chromatography system and can identify the fluid being leaked.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale, and in some instances, various aspects of the inventive subject matter disclosed herein may be shown exaggerated or enlarged in the drawings to facilitate an understanding of different features. In the drawings, like reference characters generally refer to like features, e.g., functionally similar and/or structurally similar elements. The invention will be more fully understood from the following detailed description taken in conjunction with the accompanying drawings, in which.

DETAILED DESCRIPTION OF THE INVENTION

Figure 1:
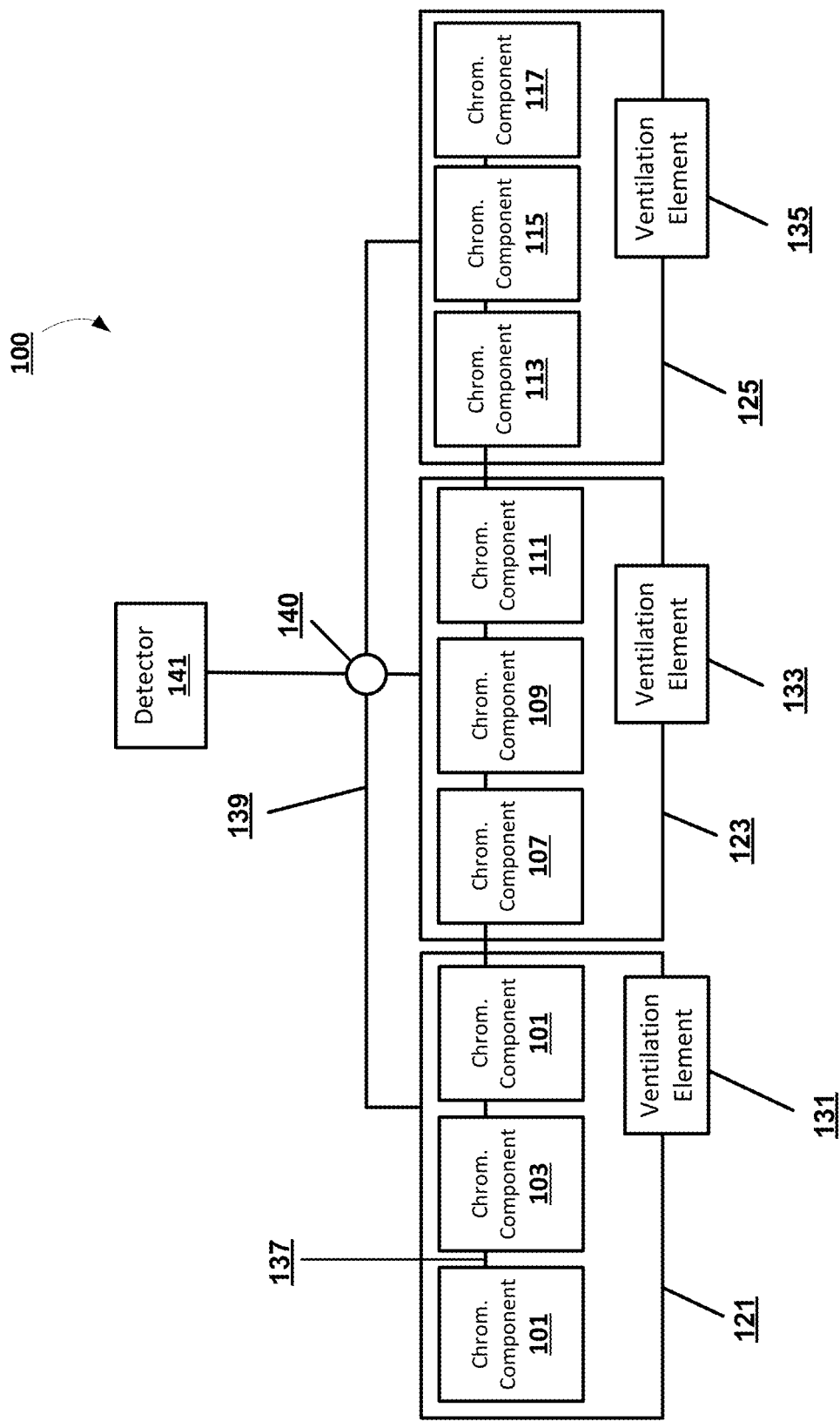
FIG. 1 is a block diagram of an exemplary system for detecting a leak, according to an embodiment of the present disclosure.

Certain exemplary embodiments will now be described to provide an overall understanding of the principles of the structure, function, manufacture, and use of the systems, method and devices disclosed herein. One or more examples of these embodiments are illustrated in the accompanying drawings. Those skilled in the art will understand that the systems, method and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Chromatography systems use high pressure mobile phase solvents to perform separations through chromatography columns and other system components. These systems also use wash solutions to clean retained compounds from the system and waste streams to collect streams after a separation. The different system components including the columns, connecting tubes, fittings, etc. should be properly sealed. Any leaks in the system should be identified and fixed in order for the system to function efficiently.

The chromatography systems can include, but are not limited to, liquid chromatography, gas chromatography, supercritical fluid chromatography, and carbon dioxide based chromatography. The chromatography systems can include any size systems including, but not limited to, nanoscale, microscale, analytical scale, and prep scale.

The components of the chromatography system described herein can include tubing, fittings, connectors and various system components. Example components of a chromatography system can include, for example, a chromatography column, column case, column heater, restrictor, back pressure regulator, pump including a $CO_2$ pump or liquid modifier pump, mixer, valve, injector, detector, or any other component of a chromatography system. The various components can be made of metallic or non-metallic materials, such as stainless steel, titanium, alloys, brass, ceramics, glass, fused silica, silicon, plastics (e.g., acrylonitrile butadiene styrene (ABS), polyvinyl chloride (PVC), high impact polystyrene (HIPS), HDPE, LDPE, PP, PETE, PEEK, PTFE), etc. The chromatography system discussed herein can include a range of detectors. For example, the chromatography systems can utilize one or more of the following detectors: an ultraviolet/visible light (UV-Vis) detector, a refractive index (RI) detector, a conductivity monitor, a flame ionization detector (FID), an atomic absorbance spectrometers (AAS), or a mass spectrometer (MS).

In some embodiments, the pressure of the flows or streams in the chromatography system can be, at times, lower than atmospheric pressure, e.g., when a vacuum is created within the system. In other embodiments, the pressure can be, at times, high. Low pressure can occur before a pump or after a back pressure regulator. High pressure can be after a pump and through the column. The pressures of the chromatography system can be, for example, 0, 10, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 15000, 20000, 25000, 30000, 35000, 40000, 45000, 50000, 55000, 60000, 65000, 70000, 75000, 80000, 85000, 90000, 95000, 100000, 105000, 110000, 115000, 120000, 125000, 130000, 135000, 140000, 145000, 150000, 160000, 170000, 180000, 190000 or 200000 psi. These values can define a range, such as between about 100 psi to about 20,000 psi.

In some embodiments, leaks can be detected and/or located in systems running at flow rates of about 1, 2, 5, 10, 20, 50, 100, 200, 500 nL/min, 1, 2, 5, 10, 20, 50, 100, 200, 500 µL/min, 1, 2, 5, 10, 20, 50, 100, 200, 500 mL/min, 1, 2, 5 or 10 L/min. These values can be used to define a range, such as between about 100 nL/min to about 1 L/min. Low flow rate systems can have a high percentage leak that may be difficult to detect. Additionally, leaks may be difficult to detect because a solvent or fluid may evaporate before accumulating sufficient volume to visibly pool or drip from the component. Prior leak detection techniques use sensors that need significant volumes of leaked fluid to operate. One such technique uses optical detectors that detect liquid leaks by measuring the refractive index when the sensor surface touches a liquid. Such techniques cannot detect smaller scale leaks that produce only trace amounts of liquid or vapor leaks. In some cases, detectors may merely detect the presence of a leak without indicating the location of the leak. In order to locate a leak, the user may need to rely on trial-and-error by disconnecting and reconnecting several components.

According to embodiments of the present disclosure, a leak detection system is disclosed that facilitates detecting fluidic leaks in a chromatography system. The system includes a number of sealable compartments that are configured to enclose a component(s) of a chromatography system. The compartments serve as sealed collection containers for leaked fluid, thus preventing the fluid from spreading to other areas or onto moisture-sensitive components, such as circuit boards. The compartments also contain any evaporated fluid and prevent it from diffusing undetected into the atmosphere. The system can use gas/vapor sensors placed in communication with the sealed compartments to detect leaks from components within the compartments. A sealable compartment allows a user to surround one or more components of a chromatography system within a substantially air-tight compartment, such that any vapor leaks can be isolated. In some embodiments, the sealed compartment is air-tight such that no gas/vapor can flow into or out of the compartment. In other embodiments, the sealed compartment is not substantially air-tight such that some gas/vapor can flow into or out of the compartment. If a leak exists, even a very minor vapor leak, the compartment is capable of allowing for sufficient vapor build up within the compartment to a detectable level such that the user can be alerted that a leak exists. The sealed compartments help increase detection sensitivity, because they confine and concentrate vapor from leaked fluid.

In some embodiments, a single central detector can be used to monitor leaks within two or more sealable compartments, and each compartment can contain one or more components of a chromatography system. For example, a number of gas conduits can be in fluid communication with the sealable compartments and can be directed individually to a central detector, or through a switching valve. In other embodiments, a separate detector can be used to monitor leaks within each sealable compartment. When a single central detector is used, one or more switching valves can be used to cause fluid communication between the detector and one of the gas conduits corresponding to one of the compartments. The central detector can monitor vapor concentration from each compartment one after another by opening and closing one or more valves. A centralized detector design makes it economically feasible to use a high sensitivity detector, such as a mass spectrometer (MS).

The opening and closing of the valve(s) can be controlled. A valve can have multiple positions including a closed position in which no fluid communication is made with any of the compartments. The switching frequency between positions can vary for each valve and for each position on each valve. For example, the valve can remain in the closed position for relatively long time, can be in an open position for a compartment containing many devices a relatively short time and in an open position for a compartment containing few devices a relatively shorter time. The valve can remain in the closed position for a designated time to allow for a sufficient headspace vapor concentration to build up. The valve position can be switched to each component every 0.1, 0.5, 1, 2, 3, 4, 5, 6, 7, 8, 9, 10, 11, 12, 13, 14, 15, 16, 17, 18, 19, 20, 30 seconds, 1, 2, 3, 4, 5, 6, 7, 8, 9, 10, 20, 30, 40, 50 minutes, 1, 2, 4, 6, 8, 12, 16, 20 or about 24 hours. These values can define a range such as from 1 second to about 1 minute. The duration of each sampling of a compartment can also vary. Each compartment can be sampled for about 0.1 millisecond, 0.2, 0.3, 0.4, 0.5, 0.6, 0.7, 0.8, 0.9, 1, 2, 3, 4, 5, 6, 7, 8, 9, 10, 20, 50, 100, 200, 500 milliseconds, 1, 2, 3, 4, 5, 6, 7, 8, 9, 10, 11, 12, 13, 14, 15, 16, 17, 18, 19, 20, 30 seconds, 1, 2, 3, 4, 5, 6, 7, 8, 9 or 10 minutes. These values can be used to define a range, such as about 10 milliseconds to about 10 seconds. The sensitivity of the detector can also impact leak detection. The detector can be capable of detecting about 0.1 ppb, 0.5, 1, 5, 10 or about 50 ppb of an mobile phase, wash, etc. component. The detector can be capable of detecting about 0.1 ppm, 0.5, 1, 5, 10 or about 50 ppm of an mobile phase, wash, etc. component. The detector can be capable of detecting about 0.1 ppt, 0.5, 1, 5, 10 or about 50 ppt of an mobile phase, wash, etc. component. These sets of values can be used to define a range, such as about 1 ppm to about 50 ppm, or from about 1 ppt to about 1 ppm.

In some embodiments, the sealable compartment can have an access door that allows a user to open the compartment and fix the cause of a leak, or remove or drain liquid and/or vapor if needed. In some embodiments, the sealable compartment can also have a ventilation element that can be used to occasionally purge the confined air within the sealable compartments to make sure that the measurements of the detector reflect the current status of the system. For example, if the sensor detects liquid vapor within one of the compartments, the entire compartment can be purged using a ventilation element, such as a fan. Positive vapor detection at the subsequent measurement can confirm the presence of a leak and minimize the probability of false positive readings. In some embodiments, a gas conduit can be routed to a waste management module, such as a chemical trap, if the liquid vapor poses a safety or health hazard.

In some embodiments, the detector can be a moisture sensor, a photoionization detector, a MS, or any suitable gas-sensitive detector. A detector can be placed in each sealable compartment, or in fluidic communication with one or more sealable compartments. When a leak occurs, leaked fluid can evaporate but its vapor is still confined and concentrated within the sealed compartment. The detector can monitor the vapor concentration, which is proportional to the size of the leak and its evaporation rate, to detect the presence and severity of a leak. In some embodiments, the sealable compartment does not need to be completely airtight. Rather, the sealable compartment only needs to seal sufficiently to allow for gas or vapor buildup within the compartment to a detectable level.

In some embodiments, the system can be implemented with multiple sealable compartments to group related fluidic components, such as the solvent container chamber, pump heads, fluid feed, the column components, etc. into multiple zones. Each compartment can have its own vapor detector, in some embodiments, and the system can monitor the various zones independently to easily locate a leak. In alternative embodiments, a central detector can be used to monitor each compartment using a switching valve and a number of gas conduits, as discussed above.

In some embodiments, the system includes a sampling device and a method for using a detector, such as a MS, in a chromatography system to detect and monitor vaporized solvent leaks. The gas sampling device can include, for example, a sealable compartment that can surround one or more components of the chromatography system and provide a substantially airtight seal around the components. The sealable compartments can be in fluid communication with the MS via one or more transfer lines. In some embodiments, the MS can be used as the central detector and can monitor leaks between injection cycles. Air samples can be obtained from the sealable compartments and transferred into the MS for quantifying the solvent vapor concentration in the sampled air.

In one embodiment, a number of sealable compartments can be positioned at various points on a chromatography system. For example, the sealable compartments may be mounted at strategic locations around a chromatography system where solvent leaks are highly suspected. The points can be selected to cover areas where leaks are most suspected, such as near pump heads, tube junctions, the solvent container chamber, etc. When a leak occurs, the leaked fluid can evaporate into the atmosphere, creating a gas/vapor mixture. As discussed above, a sealable compartments can isolate this gas/vapor mixture so that the leaked fluid does not simply diffuse into the atmosphere undetected. The mixture can be sampled and introduced to the MS for analysis. The solvent vapor can be ionized through an appropriate ionization technique, in some embodiments. Atmospheric Pressure Chemical Ionization (APCI) is a potential ionization technique suitable for gas analysis. The vapor concentration can be calculated from the MS signal intensity against a value acquired from a vapor-free reference sample or a stored reference level.

In some embodiments, the systems and methods disclosed herein can be used to perform a standalone test, or as a real-time leak detection system. In a standalone test, portions of the fluidic components of a chromatography system can be filled with a relatively volatile chromatographic liquid, such as acetonitrile or methanol, and kept under a static pressure. The selection of the relatively volatile liquid can be also be most volatile liquid used in the chromatography system, or the section of the chromatography system, e.g., needle wash, mobile phase flow path, etc., under normal conditions. The relatively volatile chromatographic liquid can also be a detectable gas. In some embodiments, all of the fluidic components of a chromatography system can be filled and tested. The static pressure can be less than, equal to, or more than the nominal or expected pressure of the chromatography system under normal operation. The static pressure can be about 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 17000, 18000, 19000, 20000, 21000, 22000, 23000, 24000, 25000, 26000, 27000, 28000, 29000 or about 30000 psi. These values can define a range, such as between about 2000 psi to about 15,000 psi. The system, or portions thereof, can be kept under the static pressure before testing for 1, 2, 3, 4, 5, 6, 7, 8, 9, 10, 15, 20, 25, 30, 45 seconds, 1 2, 3, 4, 5, 6, 7, 8, 9, 10, 15, 20, 25 or about 30 minutes. These values can define a range, such as about 10 seconds to about 5 minutes.

The air samples from the sealable compartments at various monitoring points can be sequentially analyzed, and the results can reveal the location and severity of any leaks. This operation mode can be particularly useful for initial system setup, routine performance maintenance, or troubleshooting. For example, the present disclosure can include a method of detecting a leak in a chromatography system including sealing a plurality of components of a chromatography system within a sealable compartment, and flowing a relatively volatile fluid between one or more of the plurality components, and monitoring the interior of at least one of the sealed compartment for a fluid leak, wherein the fluid leak is characterized the presence of liquid, vapor, or both within the sealable compartment.

Real-time leak monitoring can be implemented, in some embodiments, using the same chromatography system detector. For example, the sample to a mass spectrometry detector can be switched between the chromatography eluent and the monitoring gas/vapor samples from compartments. A high-speed switching valve can be used. Each sample stream can use a different ionization technique with the mass spectrometer. In one embodiment, the chromatography eluent is directed to a LC/MS using electrospray ionization (ESI) and the gas/vapor monitoring samples are directed to the LC/MS but ionized through the APCI process. Switching, or rapid switching, between two different ionization techniques, e.g., ESI and APCI, on a single ion source device can allow two dissimilar sample types to be analyzed on a single experimental setup. In one such example, real-time leak detection can be performed between the LC runs, such as during the LC gradient flush or the equilibrium step, so that the leak detection process does not interfere with the LC/MS data acquisition during sample analysis.

In some embodiments, the detector can also identify the fluid or solvent that is leaking. A number of different types of solvents may be used within a chromatography system. For example, systems may require one, two, or more mobile phase supplies, strong and weak wash solutions, or cleaning and rinse solutions, and may require additional fluids for maintenance purposes. In some embodiments, the detector can be configured to detect the presence of a leak and also identify the substance that is leaking and/or the severity of the leak. In exemplary embodiments, the detector can determine the presence of the various aqueous and organic solvents, including water, formic acid, ammonia, trifluoroacetic acid, methanol, ethanol, 2-propanol, acetonitrile, tetrahydrofuran, dimethoxyethane, chlorobutane, dichlorobenzene, pentanone, acetone, chloroform, cyclohexane, diethyl ether, ethyl acetate, pentane, hexane, heptane, toluene, and combinations or mixtures thereof.

FIG. 1 is a block diagram of an exemplary system 100 for detecting a leak, according to an embodiment of the present disclosure. The system 100 includes a first sealable compartment 121, a second sealable compartment 123, and a third sealable compartment 125. Each sealable compartment 121, 123, 125 can create a substantially airtight seal around one or more components of a chromatography system. The first sealable compartment 121 contains three components 101, 103, 105 of a chromatography system; the second sealable compartment 123 contains three components 107, 109, 111 of a chromatography system; and the third sealable compartment 125 contains three components 113, 115, 117 of a chromatography system. Each of the components 101, 103, 105, 107, 109, 111, 113, 115, 117 of the chromatography system is in fluid communication with each other via the fluidic path 137. As discussed above, the components 101, 103, 105, 107, 109, 111, 113, 115, 117 can include, for example, tubing, fittings, connectors, chromatography columns, column cases, column heaters, restrictors, back pressure regulators, pumps (including a $CO_2$ pump or liquid modifier pump), mixers, valves, injectors, or any other component of a chromatography system.

In some embodiments, each sealable compartment 121, 123, 125 can be in fluid communication with a central detector 141 via fluid transfer lines 139. In the embodiment shown in FIG. 1, the transfer lines 139 are in fluid communication with the central detector 141 via a switching valve 140. The central detector 141 can individually monitor vapor concentration from each sealable compartment 121, 123, 125 by controlling the switching valve 140. As discussed above, the central detector 141 can be a moisture sensor, a photoionization detector, a mass spectrometer, or any suitable gas-sensitive detector.

The system 100 also includes a ventilation element 131, 133, 135 corresponding to each sealable compartment 121, 123, 125. The ventilation element 131, 133, 135 can be used to occasionally purge the confined air within their respective sealable compartments 121, 123, 125 to make sure that the measurements of the detector 141 reflect the current status of the system. For example, if the sensor 141 detects liquid vapor within the first sealable compartment 121, the corresponding ventilation element 131 can purge the first sealable compartment 121. Positive vapor detection at a subsequent measurement of the first sealable compartment 121 can then confirm the presence of a leak within one of the components 101, 103, 105 within the first sealable compartment 121. The ventilation elements can assist in forcing the gas/vapor samples to the sensor 141.

Figure 2:
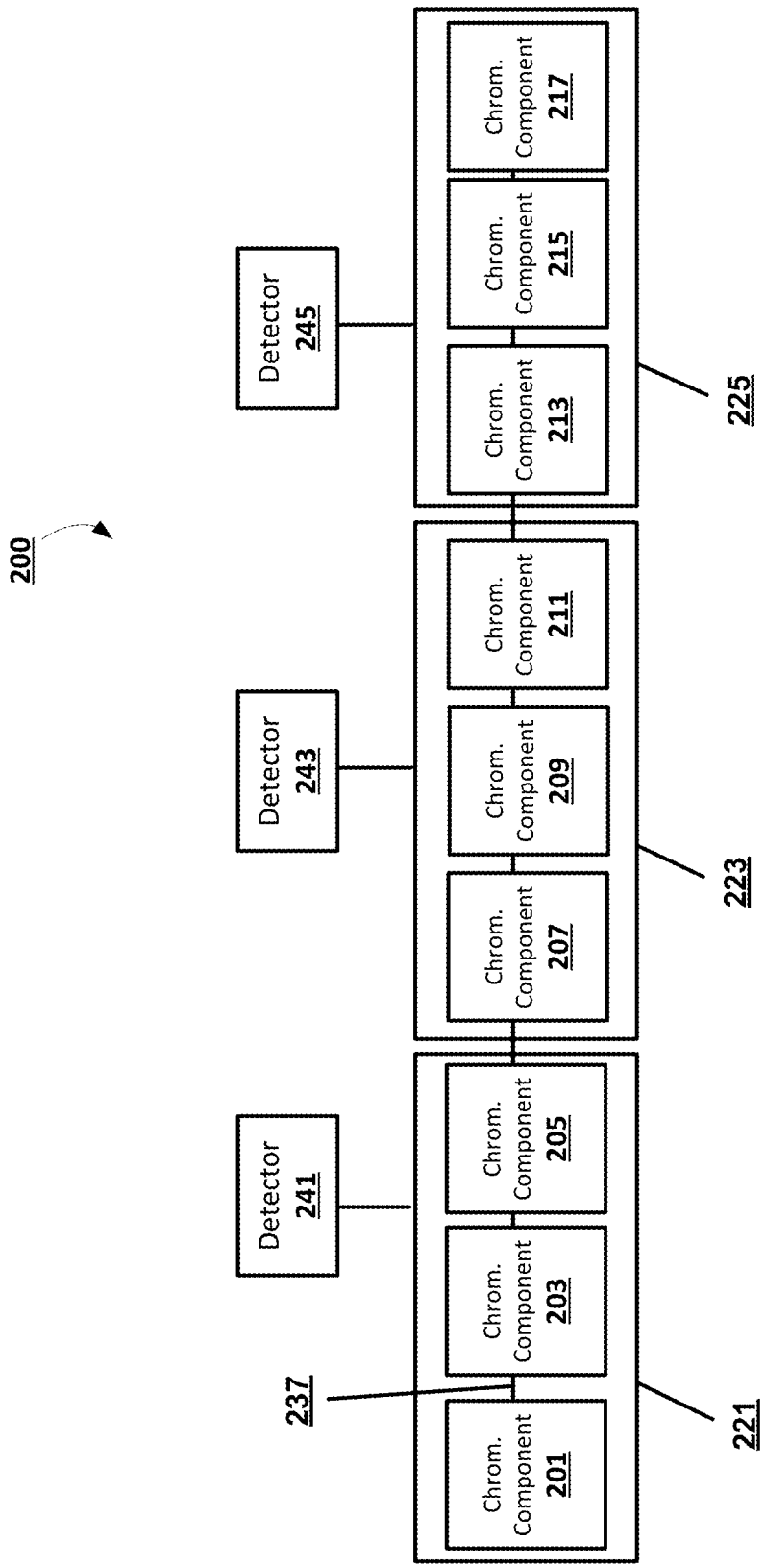
FIG. 2 is a block diagram of another exemplary system for detecting a leak, according to an embodiment of the present disclosure.

FIG. 2 is a block diagram of another exemplary system 200 for detecting a leak, according to an embodiment of the present disclosure. The system 200 includes a first sealable compartment 221, a second sealable compartment 223, and a third sealable compartment 225. Each sealable compartment 221, 223, 225 can create a substantially airtight seal around one or more components of a chromatography system. The first sealable compartment 221 contains three components 201, 203, 205 of a chromatography system; the second sealable compartment 223 contains three components 207, 209, 211 of a chromatography system; and the third sealable compartment 225 contains three components 213, 215, 217 of a chromatography system. Each of the components 201, 203, 205, 207, 209, 211, 213, 215, 217 of the chromatography system is in fluid communication with each other via the fluidic path 237. As discussed above, the components 201, 203, 205, 207, 209, 211, 213, 215, 217 can include, for example, tubing, fittings, connectors, chromatography columns, column cases, column heaters, restrictors, back pressure regulators, pumps (including a $CO_2$ pump or liquid modifier pump), mixers, valves, injectors, or any other component of a chromatography system. In different embodiments, the exemplary system shown in FIG. 2 can also include ventilation elements. The ventilation elements can increase the safety of the system and provide circulation between measurements.

The system 200 also includes a first detector 241 in fluid communication with the first sealable compartment 221, a second detector 243 in fluid communication with the second sealable compartment 223, and a third detector 245 in fluid communication with the third sealable compartment 225. Each of the detectors 241, 243, 245 can monitor vapor concentration from its respective sealable compartment 221, 223, 225. As discussed above, the detectors can be moisture sensors, photoionization detectors, mass spectrometers, or any suitable gas-sensitive detectors. In some embodiments, a different detector (e.g., different type of detector) can be selected for each compartment based on the expected leak within, the size, the shape, the number of components, etc.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An apparatus configured for detecting a fluid leak comprising:
 a plurality of sealable compartments, each compartment disposed to surround at least one component of a chromatography system;
 a detector in fluid communication with an interior of the plurality of sealable compartments and configured to detect a fluid leak within the plurality of sealable compartments; and
 a plurality of fluid transfer lines disposed to provide fluid communication between one of the plurality of sealable compartments and the detector.

2. The apparatus of claim 1, wherein the detector is a mess spectrometer.

3. An apparatus configured for detecting a fluid leak comprising:
 a plurality of sealable compartments, wherein each sealable compartment is disposed to surround at least one component of a chromatography system;
 a detector configured to detect a fluid leak within one of the plurality of sealable compartments, wherein the presence of liquid, vapor or both is indicative of the fluid leak; and
 a plurality of fluid transfer lines, wherein each fluid transfer line is disposed to provide fluid communication between one of the plurality of sealable compartments and the detector.

4. A method of detecting a leak in a chromatography system comprising:
 sealing a plurality of components of a chromatography system within a plurality of sealable compartments; and
 detecting a fluid leak via a plurality of fluid transfer lines disposed to provide fluid communication between one of the plurality of sealable compartments and a detector, wherein presence of liquid, vapor, or both within the sealable compartment is indicative of the fluid leak.

5. A method of detecting a leak in a chromatography system comprising:
 sealing a plurality of components of a chromatography system within a plurality of sealable compartments;
 flowing a fluid between one or more of the plurality of components; and
 monitoring the interior of at least one of the sealed compartment for a fluid leak via a plurality of fluid transfer lines disposed to provide fluid communication between one of the plurality of sealable compartments and a detector, wherein presence of liquid, vapor, or both within the sealable compartment is indicative of the fluid leak.

* * * * *